United States Patent
Stoltz et al.

(10) Patent No.: US 12,064,833 B2
(45) Date of Patent: Aug. 20, 2024

(54) BRACKET PRESENTER FOR ULTRASONIC WELDER

(71) Applicant: T.A. Systems, Inc., Rochester Hills, MI (US)

(72) Inventors: Hendrik Stoltz, Dryden, MI (US); Theodore Robert Brown, Birmingham, MI (US); Miso Todorovic, Windsor (CA)

(73) Assignee: T.A. SYSTEMS, INC., Rochester Hills, MI (US)

( * ) Notice: Subject to any disclaimer, the term of this patent is extended or adjusted under 35 U.S.C. 154(b) by 194 days.

(21) Appl. No.: 17/572,944

(22) Filed: Jan. 11, 2022

(65) Prior Publication Data

US 2022/0226942 A1 Jul. 21, 2022

Related U.S. Application Data

(60) Provisional application No. 63/138,102, filed on Jan. 15, 2021.

(51) Int. Cl.
| | | |
|---|---|---|
| *B23K 37/04* | (2006.01) | |
| *B23K 20/10* | (2006.01) | |
| *B23K 101/36* | (2006.01) | |
| *B29C 65/08* | (2006.01) | |

(Continued)

(52) U.S. Cl.
CPC .............. *B23K 37/04* (2013.01); *B23K 20/10* (2013.01); *B29C 65/08* (2013.01); *B29C 65/7841* (2013.01); *B23K 2101/36* (2018.08); *B33Y 80/00* (2014.12)

(58) Field of Classification Search
CPC .... B23K 20/10; B23K 2101/36; B23K 37/04; B29C 65/08; B29C 65/7841; B29C 66/112; B29C 66/131; B29C 66/532; B29C 66/61; B29C 66/8161; B29C 66/8322;

(Continued)

(56) References Cited

U.S. PATENT DOCUMENTS

| | | | |
|---|---|---|---|
| 10,421,237 B2 | 9/2019 | Schwarz | |
| 2014/0231020 A1* | 8/2014 | Scheu | ................... B29C 66/112 156/580.2 |
| 2020/0164490 A1* | 5/2020 | Bernini | ................... B23Q 3/088 |

FOREIGN PATENT DOCUMENTS

| | | |
|---|---|---|
| DE | 102009019644 A1 | 11/2010 |
| JP | 2001058634 A | 3/2001 |
| WO | 2010029308 A1 | 3/2010 |

OTHER PUBLICATIONS

European Search Report for European Application No. 22151615.6 mailed Jun. 28, 2022.

* cited by examiner

*Primary Examiner* — Philip C Tucker
*Assistant Examiner* — Jimmy R Smith, Jr.
(74) *Attorney, Agent, or Firm* — Carlson, Gaskey & Olds, P.C.

(57) ABSTRACT

A bracket presenter for an ultrasonic welder includes a one-piece first bracket portion and a one-piece second bracket portion mounted relative to one another. First and second tapered features are respectively provided by the first and second bracket portions and are nested relative to one another. The first and second tapered features engage in an extended position and are spaced from one another in a compressed position to provide a clearance enabling the first and second bracket portions to float lateral relative to one another. A spring biases the first and second bracket portions apart.

9 Claims, 8 Drawing Sheets

(51) Int. Cl.
*B29C 65/78* (2006.01)
*B33Y 80/00* (2015.01)

(58) Field of Classification Search
CPC ..... B29L 2031/3044; B29L 2031/3481; B33Y 80/00; B60R 19/483
See application file for complete search history.

BRACKET PRESENTER FOR ULTRASONIC WELDER

CROSS-REFERENCE TO RELATED APPLICATIONS

This application claims priority to U.S. Provisional Application No. 63/138,102 filed on Jan. 15, 2021, and is incorporated herein by reference.

TECHNICAL FIELD

This disclosure relates to a bracket presenter used for holding a sensor bracket during an ultrasonic welding process, for example, securing the sensor bracket to a bumper fascia.

BACKGROUND

Modern vehicles increasingly use sensors to detect objects around them, such as ultrasonic parking sensors. It is common for front and rear bumper facias to include numerous sensors mounted to the bumper fascia 2 by a sensor bracket 4, which holds the sensor (FIG. 1A). As shown in FIG. 1B, one type of typical sensor bracket 4 includes a face 6 from which a sensor holder 8 extends. The sensor holder 8 receives a generally cylindrically shaped sensor in a snap fit relationship. The face 6 of the sensor bracket 4 has a contour matching an inner face or B-side of the bumper fascia 2. This face 6 is commonly ultrasonically welded to the bumper fascia 2.

Referring to FIG. 2, an example ultrasonic welder is shown. The welder 10 is used in the example to join the face 6 of the sensor bracket 4 to a substrate 14, such as a bumper fascia. A workpiece 14 is typically supported in a fixture or jig 12 during the ultrasonic welding process. The sensor holder 8 typically includes a passage should line up with a hole 90 in the workpiece 14 to center and expose a face of the sensor once fully assembled.

During installation of the sensor bracket 4 onto the bumper facia 2, a sonotrode 20 selectively engages the face 6 to impart a vibration on the face sufficient to generate heat and melt the face 6 to the substrate 14. In the example, the sonotrode 20 has one or more "points" 48 terminating in a geometry such as a PIP 50. The sonotrode 20 is operatively secured to an ultrasonic converter 16, which includes piezoelectric or other elements that vibrate (e.g., add up to 50 kHZ, for example) in response to a signal from a generator 22 that is commanded by a controller 24. The sonotrode 20 may be designed to be used at other frequencies, if desired. A booster may be mounted between the converter 16 and the sonotrode to tune the frequency provided by the converter 16 to the sonotrode 20.

During operation, a motion device advances the sonotrode 20 to engage the face 6 with the PIP 50 and maintaining contact pressure during the welding process. The motion device, for example, a pneumatic cylinder 26, may be regulated by a valve 30 that selectively controls the flow of compressed air from an air source 28 to the cylinder 26 in response to a command from the controller 24. Cooling air can be provided to the sonotrode 20 via an air line 29.

The welder 10 can be configured in a different manner than described, for example, the motion device may be provided by a servomotor and/or robot. The sensor bracket 4 must be held in a desired orientation with respect to the substrate during the ultrasonic welding process. In one example, a sensor bracket 4 is loaded onto a bracket presenter 32, for example of the type illustrated in FIG. 3A-3C. The bracket presenter 32 has a first plate 34 that is mounted to a motion device, such as a pair of cylinders 33. These cylinders 33 may be used to advance and retract the bracket presenter 32, and thus the sensor bracket 4, during the ultrasonic welding process.

It is desirable to allow slight movement between the sensor bracket 4 and the substrates 14 as the sensor bracket 4 mates with the substrate 14 to accommodate slight variations in tolerances between the parts. To this end, the bracket presenter 32 includes a second plate 36 that floats with respect to the first plate 34. In one example, fasteners, pins, and/or springs may be used to loosely locate the first and second brackets 34, 36 with respect to one another while preventing significant rotation or displacement between the first and second plates 34, 36. For example, as shown in FIG. 3A (broken view) and FIG. 3B (in phantom), a shoulder bolt 38 fixed relative to the first plate is received within a clearance hole 44 provided in the second plate 36. This arrangement accommodates horizontal float during engagement of the sensor bracket and the workpiece 14. But, undesirably, the plates are also permitted to floated when fully separated. A spring-loaded "pogo stick" 46 is provided between the first and second plates 34, 36 to enable the first plate, and thus the sensor bracket, to self-center with respect to the hole 90 in the workpiece.

A main body 40 extends from the second plate 36 in a direction opposite the first plate 34. The main body includes mounts 42, which engage locating features 52, such as apertures and/or slots in the sensor bracket 4. The various components illustrated in FIGS. 3A-3C are provided by numerous discrete parts that must be machined to size and assembled with respect to one another, adding great cost and complexity to the bracket presenter 32.

SUMMARY

In one exemplary embodiment, a bracket presenter for an ultrasonic welder, the bracket presenter includes a one-piece first bracket portion and a one-piece second bracket portion that is mounted relative to one another. First and second tapered features are respectively provided by the first and second bracket portions. The first and second tapered features are nested relative to one another and engage in an extended position and are spaced from one another in a compressed position to provide a clearance that enables the first and second bracket portions to float lateral relative to one another. The first and second brackets are closer to one another in the compressed position than when in the extended position.

In a further embodiment of the above, the second bracket portion has a central body with mounts that are configured to support a sensor bracket in a desired orientation. The first and second bracket portions respectively include first and second plates. The bracket presenter further includes a set of first posts that extend from one of the first and second plates. Each of the first posts have a generally first conical shape and increase in diameter from the one of the first and second plates. A set of first tapered walls extend from another of the first and second plates. Each of the first tapered walls provide a first generally conical pocket that receives a corresponding one of the first posts. The bracket presenter further includes at least one spring that is arranged between the first and second plates. The first and second plates define a first height in an extended position. The first and second plates define a second height that is less than the first height in a compressed position in which the at least one spring is compressed. The first posts and their respective first tapered walls have a clearance between them in the compressed position and are in engagement with one another in the extended position. The first posts and first tapered walls provide the first and second tapered features.

In a further embodiment of the above, the one-piece first and second bracket portions and their respective first and second tapered features are each formed of 3D-printed layers.

In a further embodiment of the above, the second bracket portion has a central body that extends from the second plate on a side opposite the set of the first post or the set of first tapered walls. The central body is configured to receive a sensor bracket.

In a further embodiment of the above, the bracket presenter includes a second post that extends from the other one of the first and second plates. The second post has a second conical shape that increases in diameter from the other of the first and second plates. A second tapered wall extends from the one of the first and second plates to provide a second generally conical pocket that receives the second post.

In a further embodiment of the above, the set of first posts are provided on the first plate, and the second post is provided on the second plate.

In a further embodiment of the above, the at least one spring includes a pair of springs. One of the pair of springs circumscribes a corresponding one of the first posts.

In a further embodiment of the above, at least one of the first and second plates includes the springs integral with the corresponding one of the one-piece first and second bracket portions.

In a further embodiment of the above, a spacer is provided between at least several coils of the at least one spring to generate a preload that ensures engagement between the first posts and their respective first pockets in the extended position.

In another exemplary embodiment, a method of securing a sensor bracket to a substrate, the method includes mounting a sensor bracket to a bracket presenter that has first and second bracket portions that are movable relative to one another and with a spring that is arranged between the first and second bracket portions. The method further includes advancing the sensor bracket toward a substrate and engaging a hole in a substrate with an end of the second bracket. The method further includes moving the first and second bracket portions toward one another and compressing the spring to allow the second bracket portion to float relative to the first bracket portion. The moving step includes decoupling first and second tapered surfaces that are respectively provided by the first and second bracket portions. The method further includes locating the sensor bracket relative to the hole with the end. The method further includes seating the sensor bracket against the substrate, ultrasonically welding the sensor bracket to the substrate, and retracting and separating the bracket presenter from the sensor bracket.

In another exemplary embodiment, a method of manufacturing a bracket presenter, the method includes printing a first bracket portion with a first tapered feature, printing a second bracket portion with second tapered feature that is configured to selectively cooperate with the first tapered feature between extended and compressed bracket presenter positions, and providing a spring between the first and second bracket portions.

In a further embodiment of the above, the spring provides the step which includes printing the spring between the first and second bracket portions.

In a further embodiment of the above, the spring circumscribes the first and second tapered features.

In a further embodiment of the above, the spring printing step is performed during at least one of the first and second bracket portions printing steps such that the spring is integrally formed with the at least one of the first and second bracket portions.

In a further embodiment of the above, the method includes the step of inserting a space into the spring subsequent to the printing steps.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

Figure 1A:
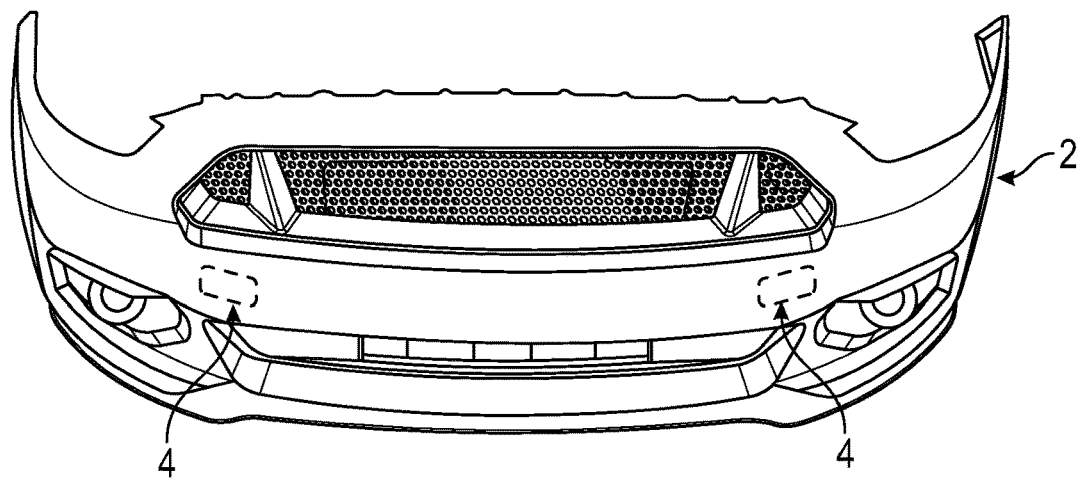
FIG. 1A illustrates an example prior art bumper fascia having a sensor with a sensor bracket.
Figure 1B:
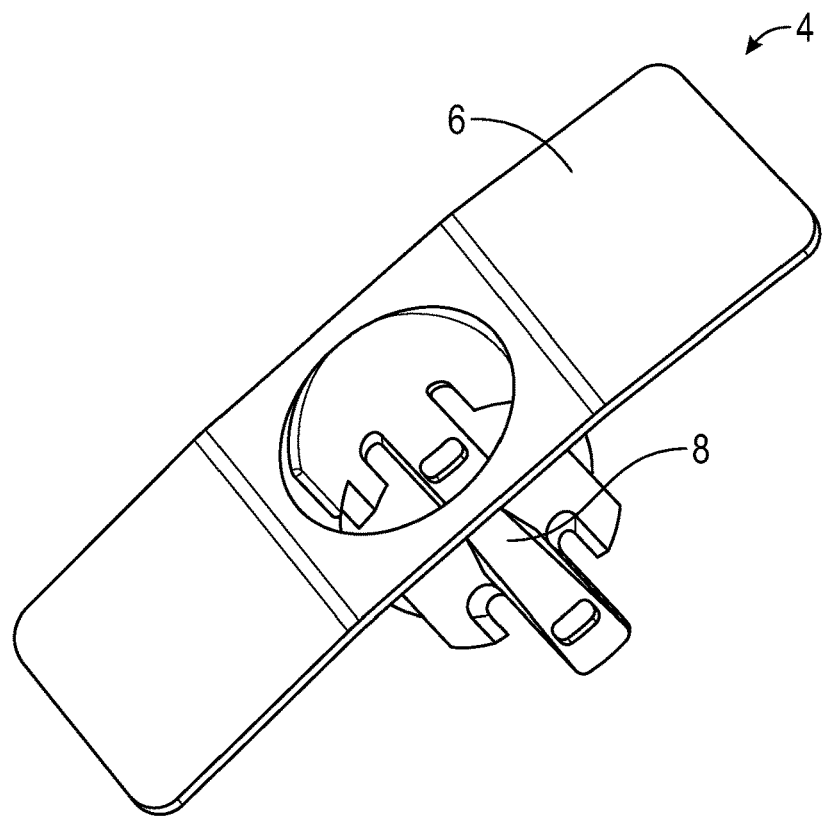
FIG. 1B illustrates an example prior art sensor bracket.
Figure 2:
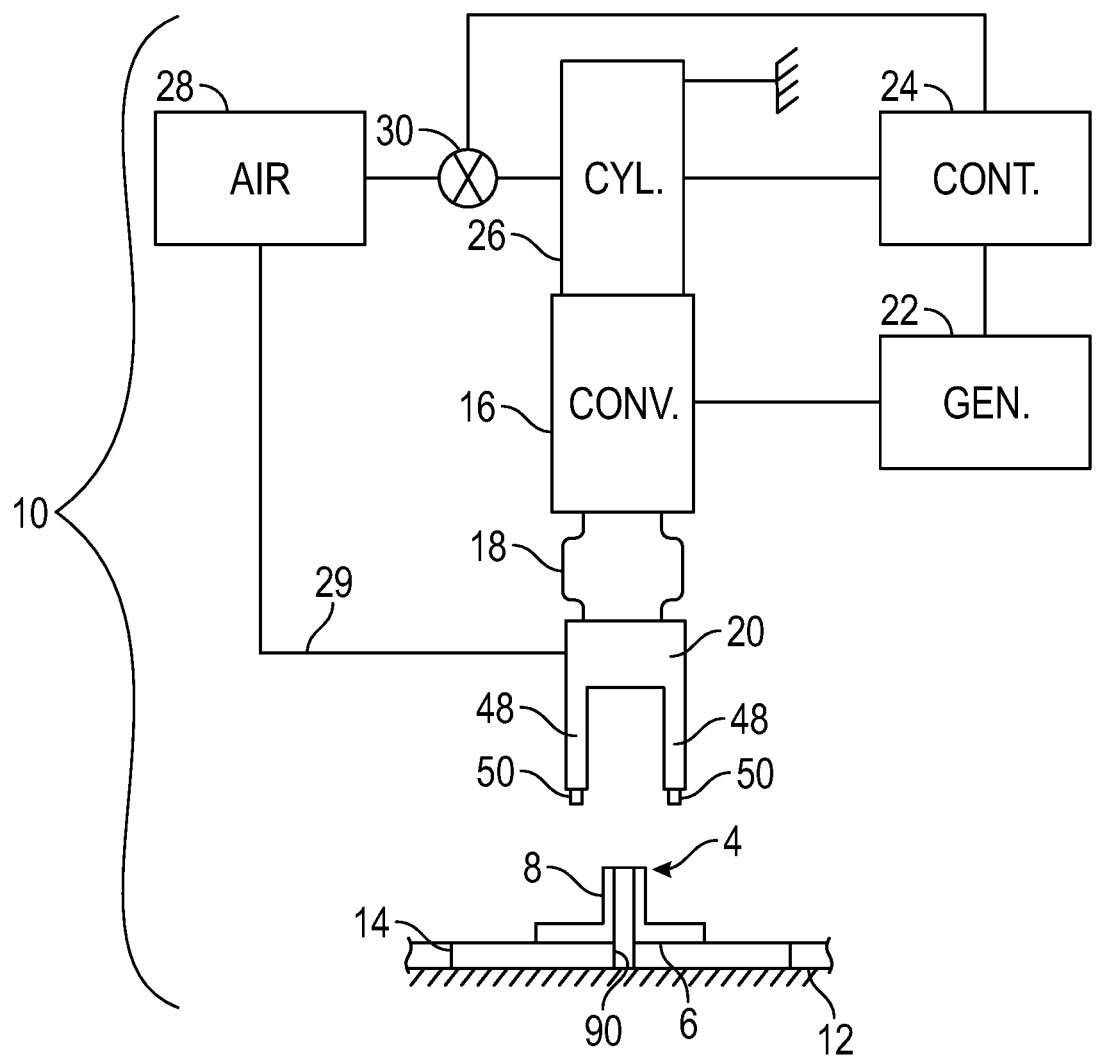
FIG. 2 schematically illustrates a common ultrasonic welder.
Figure 3A:
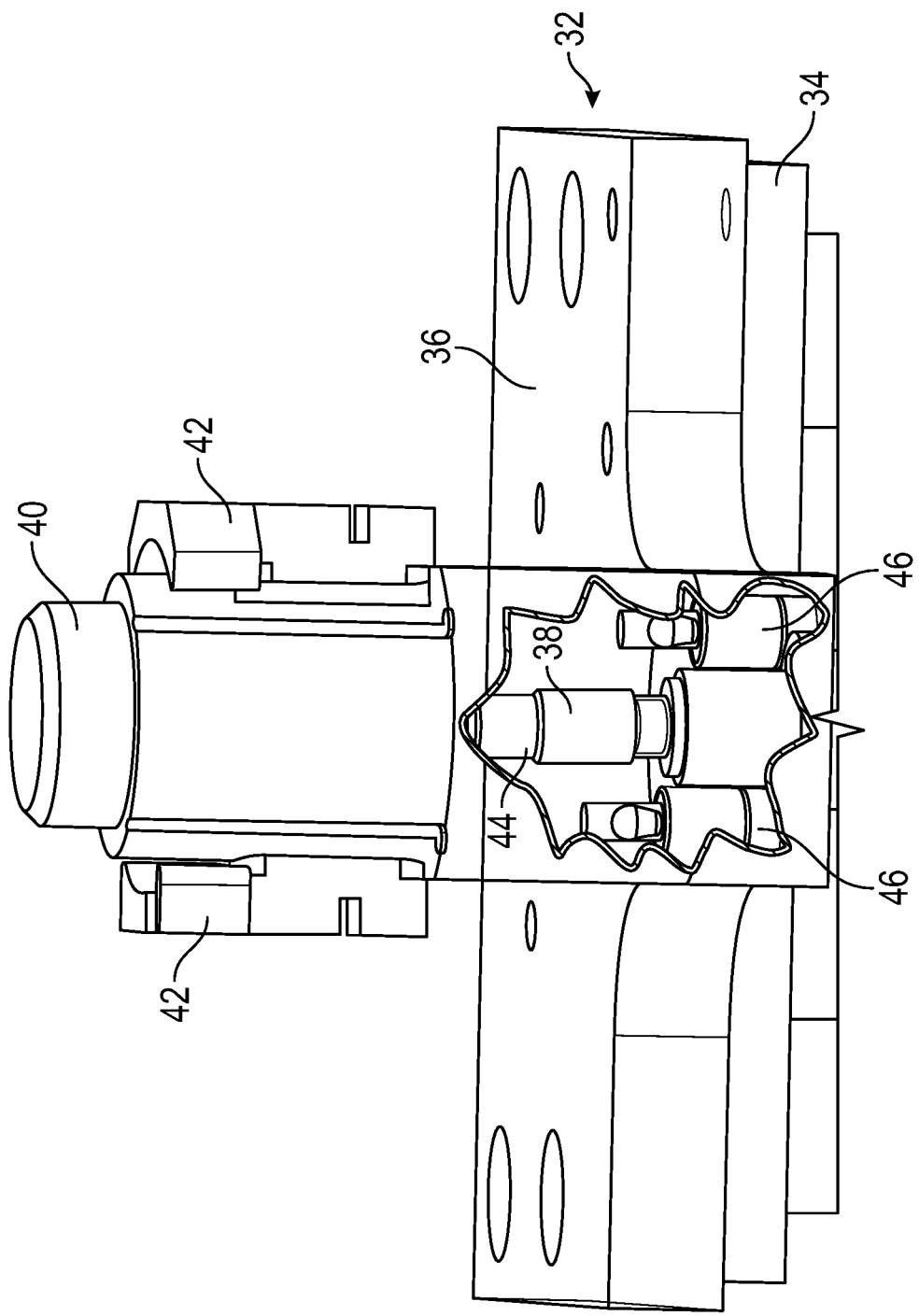
FIGS. 3A-3C illustrate a prior art bracket presenter used to hold a sensor bracket during an ultrasonic welding process.
Figure 3B:
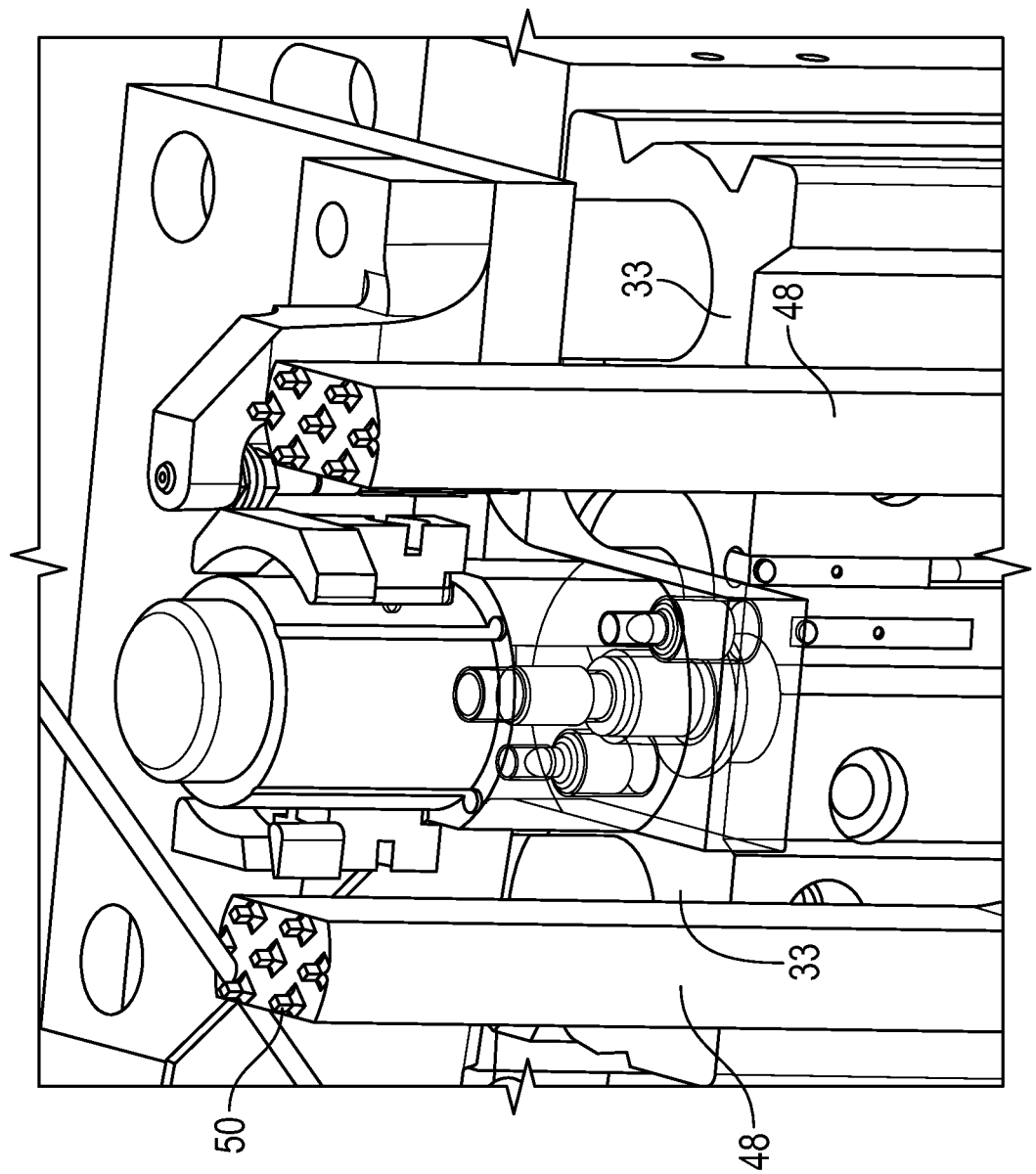
Figure 3C:
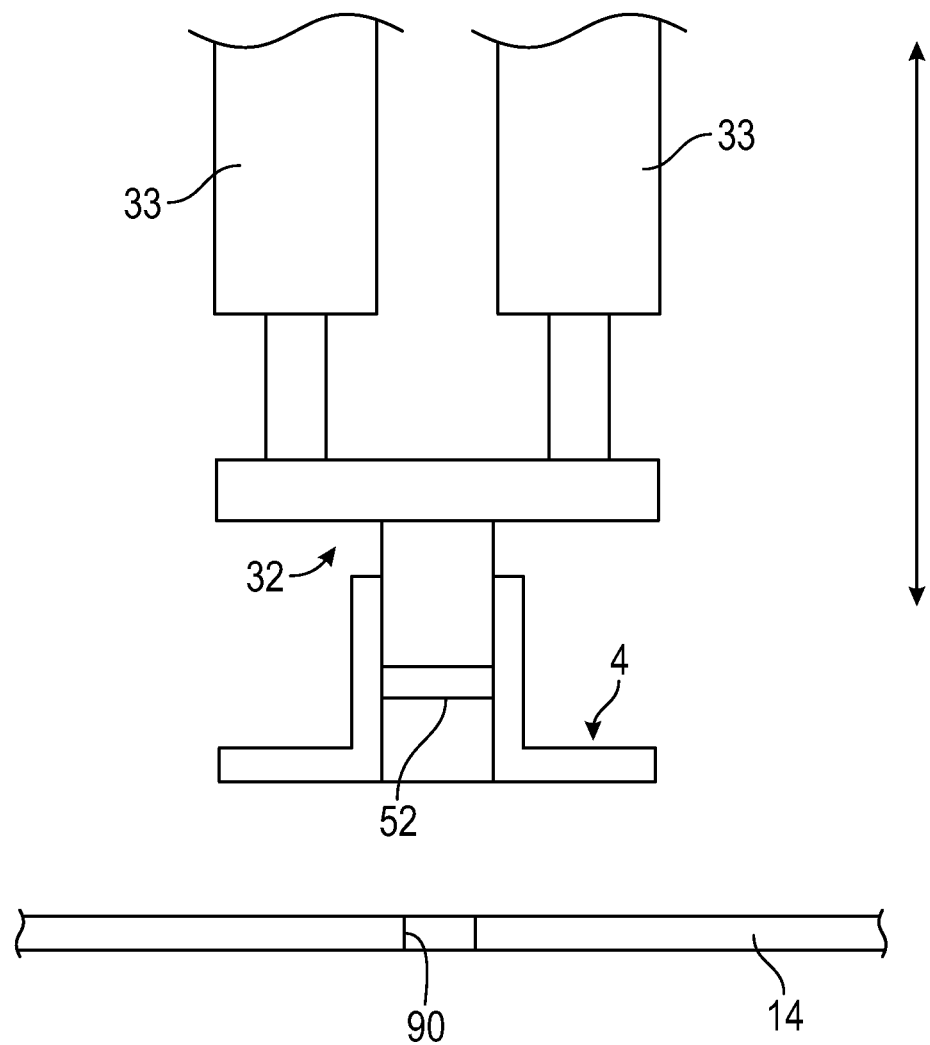

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Referring to FIGS. 4-7, an example bracket presenter 54 includes first and second bracket portions 56, 58 and/or one or more springs 64 that are formed simultaneously during a 3D-printing process using, for example, a polymer such as a fiber reinforced nylon. The bracket presenter 54 may also be formed from other materials, if desired. Multiple 3D-printed layers are laid down to form the first and second bracket portions 56, 58 to provide one-piece, integral structures that are unitary and are able to move relative to one another, but also include capture features that limit their travel relative to one another during the ultrasonic welding process described above. By "unity" it is meant that the first and second bracket portions are retained with respect to one another without the need for further assembly. This structural relationship avoids the many separately machined and secured parts of the prior art, while providing additional advantages not found in traditional bracket presenters.

The bracket presenter 54 is manufactured by printing the first bracket portion 56 with a first tapered feature (e.g., first posts 66). At the same time, the second bracket portion 58 is printed with a second tapered feature (e.g., tapered walls 72) that are configured to selectively cooperate with the first tapered feature between extended and compressed bracket presenter positions (H1, H2). It should be understood that the tapered features need not be provided by conical surfaces, rather that the points of engagement and disengagement between the first and second tapered features be of different sizes to permit coupling and decoupling of the first and second bracket portions 56, 58 from one another. The first bracket portion 56 may be the fixed part and the second bracket portion 58 may be the floating part, or vice versa.

In one example, a spring 64 is printed about, or circumscribing, each of the first and second tapered features to provide a compact design. The spring(s) 64 can be printed while the first and second bracket portions 56, 58 are printed such that the spring(s) 64 is integrally formed with the at least one of the first and second bracket portions 56, 58. It is desirable for the first and second tapered features to engage one another when the first and second bracket portions 56, 58 are in the extended position (H1). This enables the bracket presenter 54 to be positively positioned for automated loading of the sensor bracket 4 onto the presenter. If the spring 64 is printed between the first and second bracket portions 56, 58, then then there will be no preload on the spring 64 and the first and second tapered features will not be in full engagement. So, a spacer 96 (FIGS. 5 and 7) is inserted between coils in the spring 64 subsequent to printing.

Figure 4:
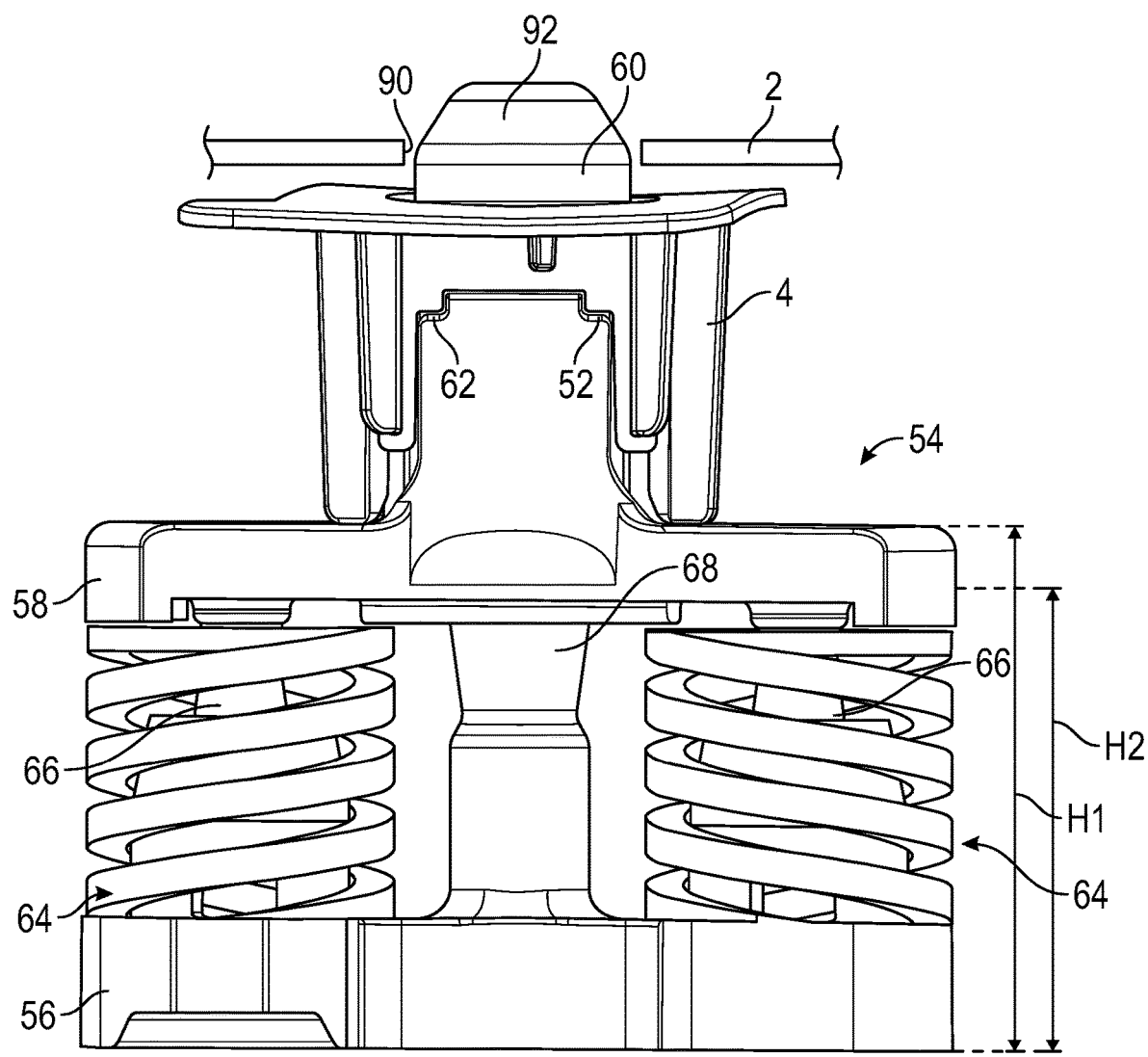
FIG. 4 is a side view of the disclosed bracket presenter with a sensor bracket mounted thereon.

The bracket presenter 54 has the one-piece first bracket portion 54 and a one-piece second bracket portion 56 mounted relative to one another in one disclosed example. The second bracket portion 58, which is the floating part in the example, has a central body 60 with mounts 62 configured to support the sensor bracket 4 in a desired orientation, as best shown in FIG. 4. The first and second bracket portions 56, 58 respectively including first and second plates, with the first plate secured to the sonic welder, and second plate supports the central body 60.

The central body 60 has a tapered end 92 that enables the second bracket portion 58, and thus the carried sensor bracket 4, with respect to the substrate 2 as the tapered end 92 is inserted into the hole, the bracket presenter 5 is compressed and the second bracket portion 58 begins to float, as explained in more detail below.

A set of first posts 66 extend from one of the first and second plates, in the example, the second plate, to provide the first tapered features. Each of the first posts 66 has a generally first conical shape and increasing in diameter from the second plate in the example. A set of first tapered walls 72 extend from the other of the first and second plates, here, the first plate, to provide the second tapered features. Each of the first tapered walls 72 provide a first generally conical pocket that receives a corresponding one of the first posts 66 in a nested relationship. These complementary tapered surfaces provide a positive location when engaged with one another in the extended position H1. The first posts 66 and their respective first tapered walls 72 have a clearance 84 (FIG. 6) between them in the compressed position H2, which enables floating of the second bracket portion 58 in all directions in plane perpendicular to the direction of compression as well as some wobble of the second bracket portion 58.

Figure 5:
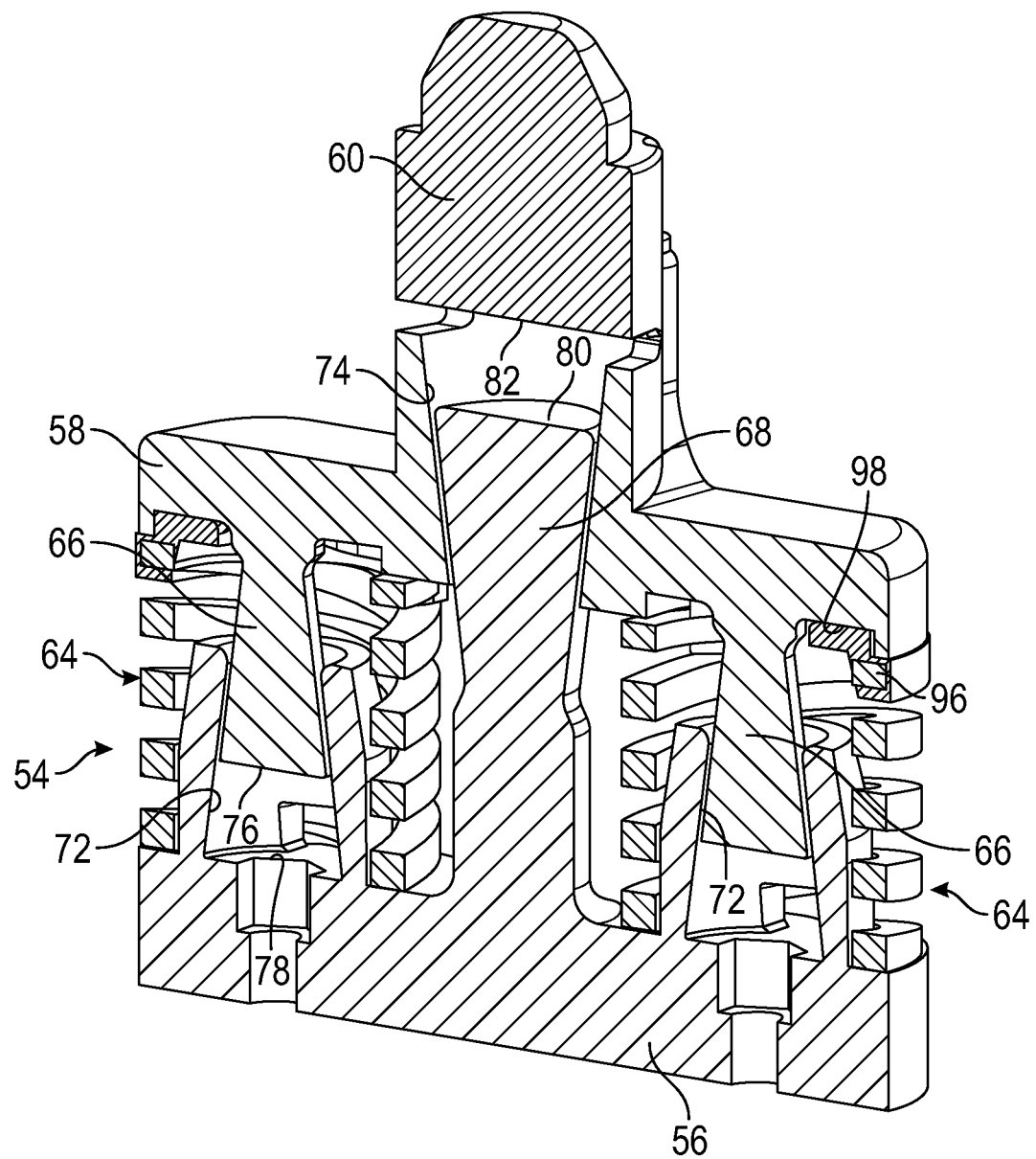
FIG. 5 is a cross-sectional view of the bracket presenter shown in FIG. 4 without the sensor bracket.
Figure 6:
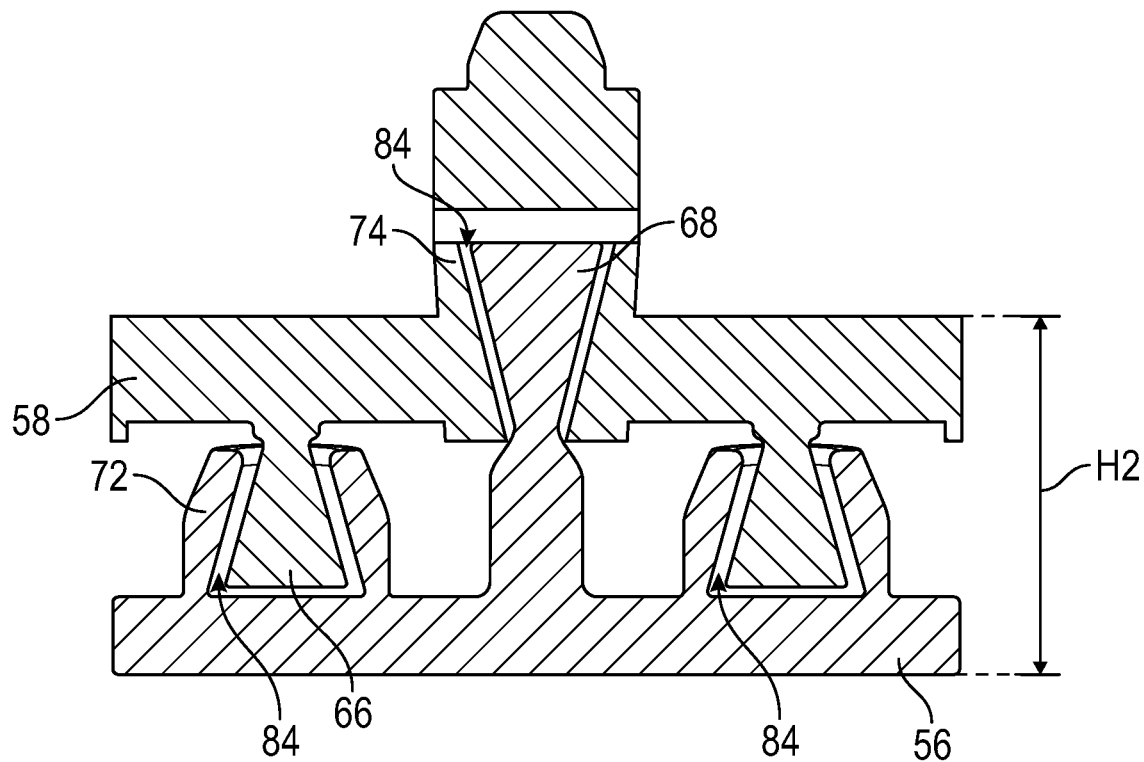
FIG. 6 is a cross-sectional view of the sensor bracket shown in FIG. 5 without springs for clarity.
Figure 7:
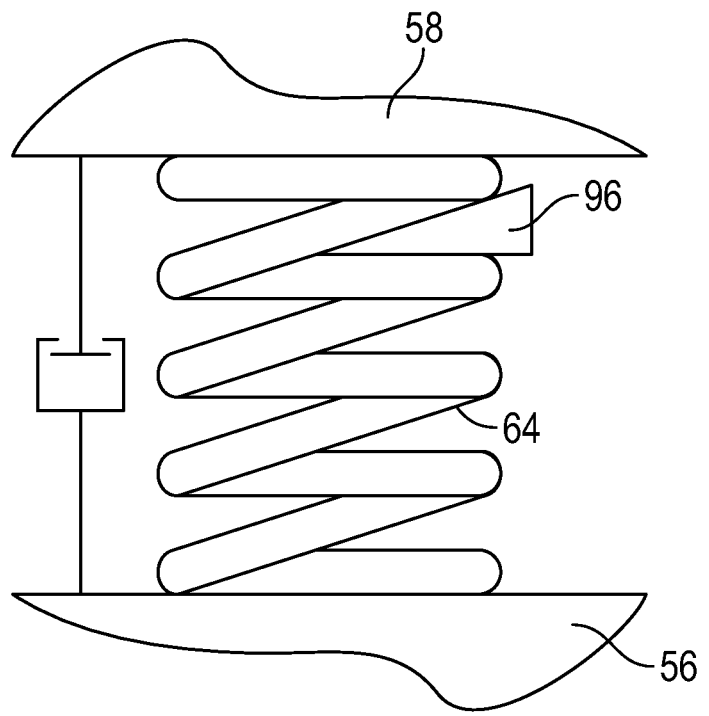
FIG. 7 schematically illustrates a spring spacer.

At least one spring 64 is arranged between the first and second plates. In the example, the spring 64 is printed along with the first and second bracket portions 54, 56. One or both ends may be integrally formed with (i.e., joined do as part of the printing process) the first and second bracket portions 54, 56. Alternatively, the spring 64 may be printed uncoupled to either of the first and second bracket portions 54, 56. In the example, a spring 64 circumscribes each first post 66/first tapered wall 72 pairing. The spacer 96 can be located with respect to a recess 98 in one of the plates, as shown in FIG. 5. In this example, the spacer 96 is U- or C-shaped to accommodate the first post 66 during insertion of the spacer 96 into the recess 98.

A second post 68 extending from the other one of the first and second plates, in the example, to provide further stability and robustness. The second post has a second conical shape increasing in diameter from the first plate in the example. A second tapered wall 74 is provided on the opposite plate to provide a second generally conical pocket that receives the second post.

Some or all of the first and second posts 66, 68 may have an end that acts as a stop to limit the relative travel between the first and second bracket portions 56, 58 from the extended position H1 to the compressed position H2. The tapered features act as stops when engaged to limit travel when fully extended. Although three pairs of complementary structures are shown (one pair first post 66 and wall 72, another first post 66 and wall 72, and a second post 68 and wall 74) that provide the mating first and second tapered features, a bracket presenter may be used that only has one pair. Such a simplified configuration may be used where the sensor bracket 4 does not need to be positively located at the extended position. That is, one, two, three or more pairs of complementary structures may be used depending upon the application.

In operation, the sensor bracket 4 is secured to a substrate 2 with the sensor bracket 4 mounted to the bracket presenter 54. The first and second bracket portions 56, 58 are movable relative to one another with the springs 64 arranged therebetween. The sensor bracket 4 is advanced toward the substrate 2, and the hole 90 in the substrate 2 is engaged with the tapered end 92. The first and second bracket portions 56, 58 move toward one another and compress the springs 64, which creates clearances 84, to allow the second bracket portion 58 to float relative to the first bracket portion 56. This movement decouples the tapered surfaces between the first and second bracket portions, i.e., the first and second posts 66, 68 with respect to their first and second tapered walls 72, 74.

As a result, the sensor bracket 4 is located relative to the hole 90 with the tapered end 92 so that the sensor bracket 4 can be seated against the substrate 2. At this point, the sensor bracket 4 can be ultrasonically welded to the substrate 2 in the desired position, and the bracket presenter subsequently retracted.

The disclosed bracket presented provides a unique configuration that enables lateral floating of the first and second bracket portions 56, 58 during sensor bracket positioning, but also positive locating of the bracket presenter for automated loading of the sensor bracket onto the presenter. The design of the bracket presenter no only permits one-piece construction of each of the first and second bracket portions 56, 58, but in such a manner that the portions and even the springs can be formed simultaneously further reducing presenter manufacturing time.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A bracket presenter for an ultrasonic welder, the bracket presenter comprising:
a one-piece first bracket portion and a one-piece second bracket portion mounted relative to one another, first and second tapered features respectively provided by the first and second bracket portions, the first tapered feature is provided by a tapered post extending in a longitudinal axis, and the second tapered feature is provided by a tapered pocket circumscribing the tapered post about the longitudinal axis, the tapered post nested relative to and by the tapered pocket to capture the tapered post, the tapered post and tapered pocket engage in an extended position along the longitudinal axis and are spaced from one another in a compressed position along the longitudinal axis to provide a clearance enabling the first and second bracket portions to float lateral relative to one another, the first and second bracket portions closer to one another in the compressed position than when in the extended position.

2. The bracket presenter of claim 1, wherein the one-piece first and second bracket portions and their respective first and second tapered features are each formed of 3D-printed layers.

3. A bracket presenter for an ultrasonic welder, the bracket presenter comprising:
a one-piece first bracket portion and a one-piece second bracket portion mounted relative to one another, first and second tapered features respectively provided by the first and second bracket portions, the first and second tapered features nested relative to one another and engaging in an extended position and spaced from one another in a compressed position to provide a clearance enabling the first and second bracket portions to float lateral relative to one another, the first and second bracket portions closer to one another in the compressed position than when in the extended position, the second bracket portion having a central body with mounts configured to support a sensor bracket in a desired orientation, the first and second bracket portions respectively including first and second plates;
wherein a set of first posts extend from one of the first and second plates, each of the first posts having a first conical shape and increasing in diameter from the one of the first and second plates, and a set of first tapered walls extend from another of the first and second plates, each of the first tapered walls provide a first conical pocket that receives a corresponding one of the first posts; and
at least one spring arranged between the first and second plates, wherein the first and second plates define a first height in the extended position, and the first and second plates define a second height that is less than the first height in the compressed position in which the at least one spring is compressed, wherein the first posts and their respective first tapered walls have a clearance between them in the compressed position and are in engagement with one another in the extended position, wherein the first posts and first tapered walls provide the first and second tapered features.

4. The bracket presenter of claim 3, wherein the second bracket portion has the central body extending from the second plate on a side opposite the set of the first posts or the set of first tapered walls, the central body is configured to receive the sensor bracket.

5. The bracket presenter of claim 3, comprising a second post extending from the other set of the first and second plates, which does not have the set of first posts extending thereof, the second post has a second conical shape increasing in diameter from the other set of the first and second plates, and a second tapered wall extends from the one of the first and second plates to provide a second conical pocket that receives the second post.

6. The bracket presenter of claim 5, wherein the set of first posts are provided on the first plate, and the second post is provided on the second plate.

7. The bracket presenter of claim 3, wherein the at least one spring includes a pair of springs, one of the pair of springs circumscribing a corresponding one of the first posts.

8. The bracket presenter of claim 3, wherein at least one of the first and second plates includes the at least one spring integrally formed with the corresponding one of the one-piece first and second bracket portions.

9. The bracket presenter of claim 3, wherein a spacer is provided between at least several coils of the at least one spring to generate a preload that ensures engagement between the first posts and their respective first pockets in the extended position.

* * * * *